MAGNETIC INFORMATION-STORAGE DEVICE

Filed Aug. 11, 1960

3 Sheets-Sheet 1

INVENTOR.
RAYMOND STUART-WILLIAMS

BY Lyon & Lyon

ATTORNEYS

Dec. 22, 1964 R. STUART-WILLIAMS 3,162,845

MAGNETIC INFORMATION-STORAGE DEVICE

Filed Aug. 11, 1960 3 Sheets-Sheet 2

*INVENTOR.*
RAYMOND STUART-WILLIAMS

*BY*

ATTORNEYS

INVENTOR.
RAYMOND STUART-WILLIAMS

BY Lyon & Lyon

ATTORNEYS

United States Patent Office 3,162,845

Patented Dec. 22, 1964

3,162,845

MAGNETIC INFORMATION-STORAGE DEVICE

Raymond Stuart-Williams, Pacific Palisades, Los Angeles, Calif., assignor, by mesne assignments, to Ampex Corporation, Redwood City, Calif., a corporation of California Filed Aug. 11, 1960, Ser. No. 48,885
3 Claims. (Cl. 340—174)

This invention relates to magnetic information-storage devices and, more particularly, to improvements therein.

Magnetic storage devices such as magnetic tapes, drums, and magnetic core storages have found wide acceptance in the data-processing field because, amongst other features, information stored therein can be erased and other information can be written in its place. One of the features of a magnetic-core memory which in large measure contributes to its popularity is that it affords random access to the information stored therein.

There are a considerable number of applications for storage systems having a permanent nonerasable type of storage, wherein data entry is simple and rapid, and yet random access is still provided. Information may be stored in magnetic drums or tapes and not erased on readout, thus constituting permanent storage. However, as is well known, information cannot be randomly read out from magnetic drums or magnetic tapes. Magnetic-core storage systems having a permanent nonerasable type of storage readout is normally of the destructive type; that is, upon readout, the information stored in the memory is destroyed and requires a regeneration thereof. Thus, an expensive circuit arrangement must be provided with magnetic-core storage.

An object of this invention is the provision of a magnetic storage system which affords permanent storage and random access to the information stored.

Yet another object of this invention is the provision of a magnetic storage system wherein the information which is to be stored may be quickly entered into the memory and can thereafter be read out from the memory without destroying the information stored.

Still another object of this invention is the provision of a novel, useful, and more economical magnetic storage system.

These and other objects of this invention may be achieved by providing a magnetic storage device which in one form has a base of magnetic material. On one surface of said base there is provided a rectangular grid of grooves with lands of magnetic material adjacent the grooves. Each one of the plurality of driving wires is placed within a different one of the grooves which are parallel to each other in said grid, to extend through the entire length of said groove. Means are provided for selectively applying current to one of these driving wires. A plurality of sensing wires are provided. A different one of these sensing wires is placed in a different one of the grooves, which are at right angles to the grooves wherein the driving wires are placed. Each one of the sensing wires is connected to a different circuit for sensing, whether or not a voltage has been induced in the sensing wire in response to the excitation with current of a driving wire.

As thus far described, since the driving and sensing wires are at right angles to one another within open grooves, the excitation with current of a driving wire will not induce any voltage in a sensing wire. In order to store information in said memory whereby excitation of a driving wire will cause a voltage to be induced in a sensing wire, means are provided at the groove intersections to distort the magnetic field provided by an excited driving wire, so that magnetic flux will cut the sensing wire passing through that groove intersection. Alternatively expressed, a diagonal magnetic path is provided at the intersection of two grooves, whereby the flux emitted by an excited driving line follows the lower-reluctance path, and thus the sensing wire which is enclosed by said path is cut by magnetic flux and a voltage is induced therein. By bridging between two of the four diagonally opposite lands, a voltage of one polarity is induced in a sensing wire, and, by bridging the remaining two diagonally opposite lands, a voltage of an opposite sense may be induced in the sensing wire. Thus, this memory system affords easy entry of data thereinto, permanent storage, and random access to the information which is stored.

In another form of the invention, the grooves may be dispensed with. The grid of intersecting wires is laid on a magnetic material backing. For storing data a magnetic member diagonally bridges each of the wire intersections and contacts the magnetic material backing on both sides of a wire intersection. If the magnetic member bridges a wire intersection along one diagonal, a voltage of one polarity is induced in the sensing wire; if the bridge is made along the other diagonal, a voltage of opposite polarity is induced in the sensing wire.

The novel features that are considered characteristic of this invention are set forth with particularly in the appended claims. The invention itself, both as to its organization and method of operation, as well as additional objects and advantages thereof, will best be understood from the following description when read in connection with the accompanying drawings, in which:

Figure 1:
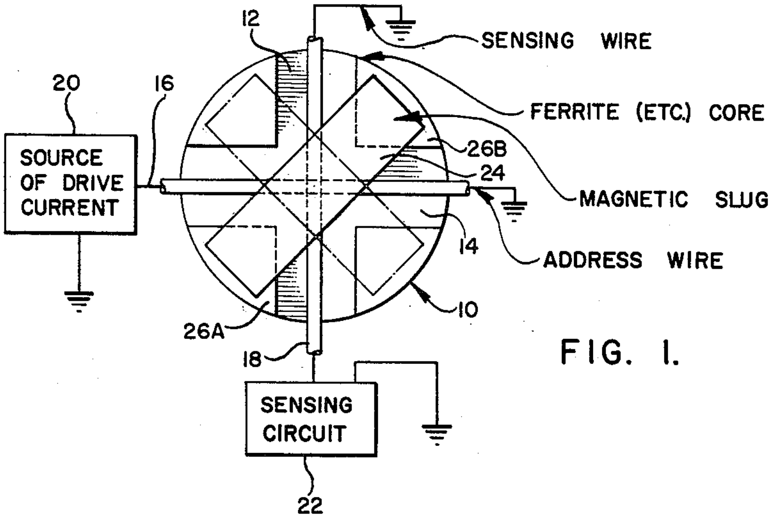
FIGURE 1 is a representation of a storage element in accordance with this invention.
Figures 2, 3:
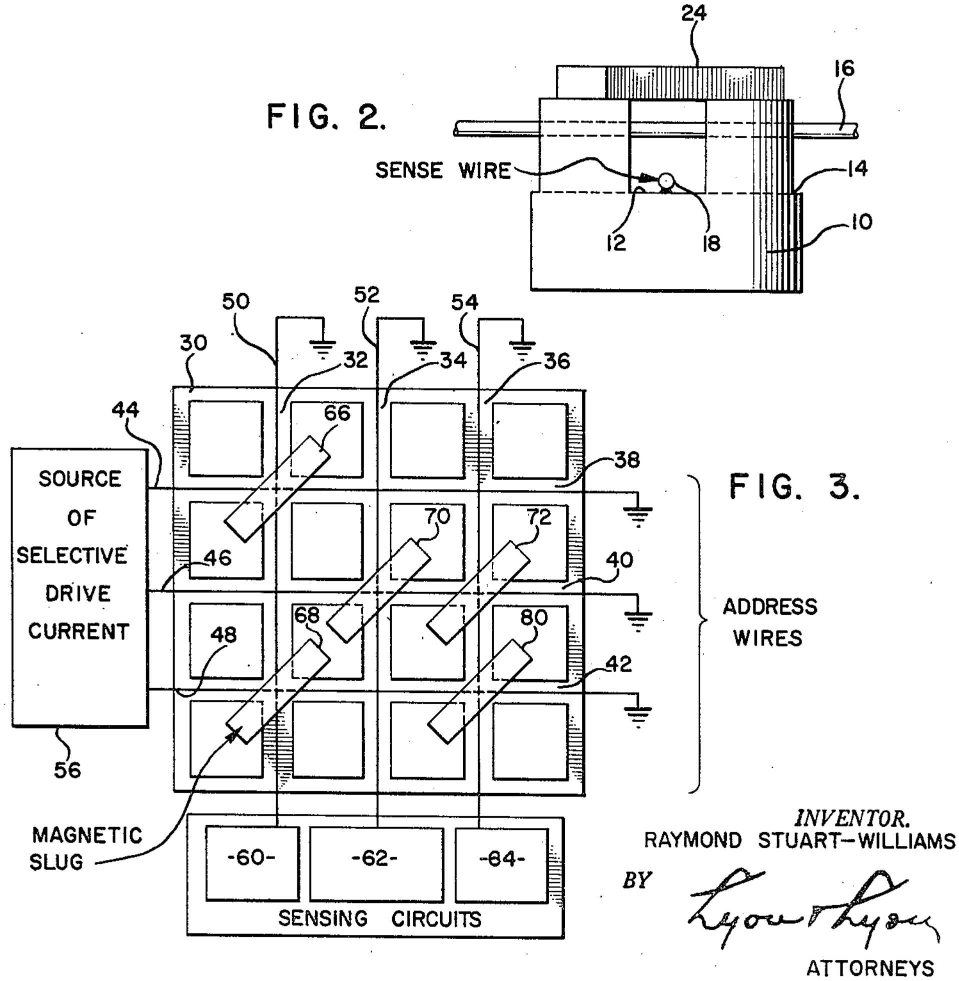
FIGURE 2 is a side view of said storage element.
FIGURES 3 and 4 are representations of embodiments of this invention.

Reference is now made to FIGURES 1 and 2, which respectively constitute plan and side views of an element which may be employed in the embodiment of the invention. This will constitute a base 10, which is made of any suitable magnetic material. This may be a magnetic ferrite material or one of the metal magnetic materials such as Permalloy. Such material can have a rectangular hysteresis characteristic, or linear characteristics. Two grooves, respectively 12, 14, are formed in the surface of the magnetic material, either by grinding or pressing. These grooves 12, 14 intersect one another at right angles. Extending along the other groove is sensing wire 18. These wires cross each other substantially at right angles and are insulated from one another, either by their spacing or by actually having insulating coating. The source of drive current 20 drives the drive line 16. A sensing circuit 22 is connected to the sensing wire 18. If a current is applied to the wire 16 from the source 20, there will be no voltage induced in the wire 18, since no lines of flux which are generated in response to the drive current in the line 16 cut the line 18, which is at right angles thereto. The sensing circuit 22 can be any suitable amplifying device.

A magnetic member 24 which can comprise any one of a piece of magnetic ferrite material, a piece of a magnetic-transformer lamination, or a piece of a Permalloy wrap material, or any other sufficient low-reluctance magnetic material, is applied to the base 10 to extend along a diagonal of the intersecting grooves and to overlie the diagonally opposite lands 26A, 26B. This magnetic member 24 closes a magnetic path which includes these diagonally opposite lands of the base 10, whereby the magnetic field established by current in the wire 16 is distorted or shifted, so that magnetic flux established will cut the sensing wire 18 and induce a voltage therein. This, of course, will be detected by the sensing circuit 22. The induced voltage will have one polarity for the magnetic member 24 in the position shown in FIGURE 1, or an opposite polarity if the magnetic member 24 were given the position shown by the dotted lines 24A in FIGURE 1. Thus, a binary representation may be established, either by the presence or absence of a magnetic member bridging the intersection of the grooves, or by a magnetic member bridging the intersection of grooves along one diagonal or the other.

Reference is now made to FIGURE 3, which exemplifies an embodiment of the invention. It will be noted that FIGURE 3 comprises a plurality of elements of the type illustrated in FIGURES 1 and 2. This will include a magnetic baseplate 30, which has a rectangular grid of grooves formed therein, either by initial pressing or by grinding after the base is finished. These may be considered as first grooves 32, 34, 36, which are parallel in space from one another, and second grooves 38, 40, 42, which are also parallel in space from one another and are at right angles to the first grooves. Lands exist adjacent these grooves. Storage occurs at the intersection of the grooves. One of a plurality of drive wires or lines 44, 46, 48 are placed within one of the grooves 38, 40, 42. One of a plurality of sensing wires 50, 52, 54 are each placed within the grooves 32, 34, 36. A source of drive currents 56 is employed to selectively drive a desired one of the drive lines 38, 40, 42. The techniques for doing this are well known to those skilled in the magnetic-core memory field. Each one of the sensing lines 50, 52, 54 is connected to a separate sensing circuit 60, 62, 64.

It will be observed that in FIGURE 3 there are nine intersections of grooves and therefore there are nine storage locations. This is not to be taken as a limitation upon the invention, since from the teachings herein those skilled in the art will readily recognize how to extend the size of this device, as desired, either in the form of a single large plane or a plurality of planes.

In the system shown in FIGURE 3, storage of data is achieved by bridging selected ones of the groove intersections with magnetic material members 66, 68, 70, 72, 80. These magnetic material members, which are shown as having a substantially rectangular shape, bridge the groove intersections along one diagonal and thus, effectively, at those intersections, provide a low-reluctance magnetic path which distorts the flux in the associated drive line whereby a voltage is induced in the sensing line crossing that intersection. Binary representation of data is achieved by the presence or absence of a magnetic member at an intersection. A word storage, as well as a word read-out, is provided by this memory. That is, instead of a single binary bit, a plurality of binary bits are obtained in response to the excitation of any one of the drive wires 44, 46, 48.

For example, the drive wire 44 intersects with sensing wires 50, 52, and 54. A magnetic member 66 only bridges the intersection through which sensing wire 50 passes. Thus, upon excitation of the drive wire 44, either with a pulse of current or with a sine wave, as desired, a voltage will be induced only in sensing wire 50. Sensing circuit 60 is the only one which will indicate a voltage has been induced. Thus, depending on the desired representation, this will indicate storage of either 100 or 011. Similarly, excitation of drive line 46, in view of the presence of magnetic members 70 and 72, will induce voltages in sensing lines 52 and 54 detected by sensing circuits 62 and 64. This will either represent 011 or 100, depending upon the binary representation desired.

Finally, excitation of drive line 48 will cause voltages to be induced in sensing lines 50 and 54 in view of the presence of the bridging magnetic members 68 and 80. Sensing circuits 60 and 64 will be excited in response thereto. This will either represent 101 or 010, depending upon the binary representations employed.

Figure 4:
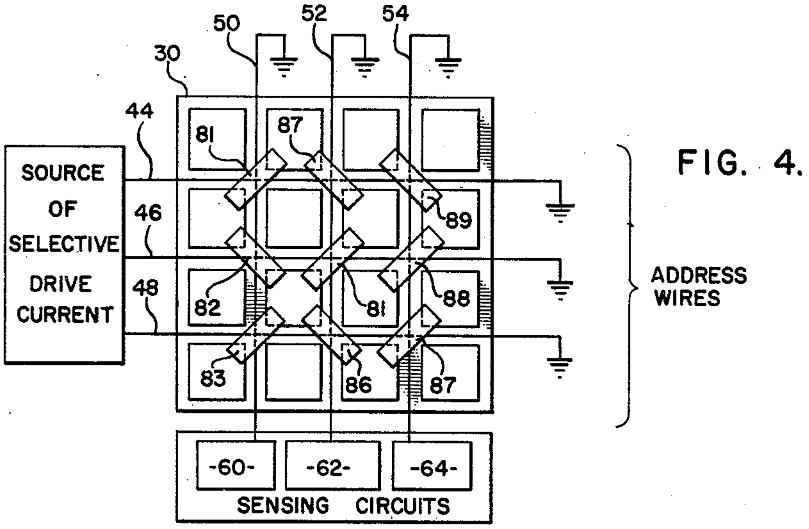

It is preferable to store binary bits, not as the presence or absence of a signal, but to use a more positive indication of the difference between two binary signals, namely, a positive and negative polarity signal. An arrangement for accomplishing this with the present invention is shown in FIGURE 4. Here the same reference numerals are applied to structure which functions similar to that shown in FIGURE 3. However, there is provided a magnetic bridging member 81 through 89 at every single intersection. These bridge an intersection, either along one or the other of the diagonals, whereby a voltage is induced of one or the other polarity in the sensing wire. The data stored in the magnetic device shown in FIGURE 4 is the same as that which has been illustrated as being stored in the device shown in FIGURE 3. The difference, however, is that wherever a magnetic bridging member was omitted in FIGURE 3, one is shown in FIGURE 4 which bridges along a diagonal opposite to the diagonal of the members shown in FIGURE 3. At each excitation of a drive wire, every one of the sensing circuits will be excited with a voltage of one polarity or the other, in accordance with the orientation of the magnetic bridging members along the diagonals of an intersection.

Figure 5:
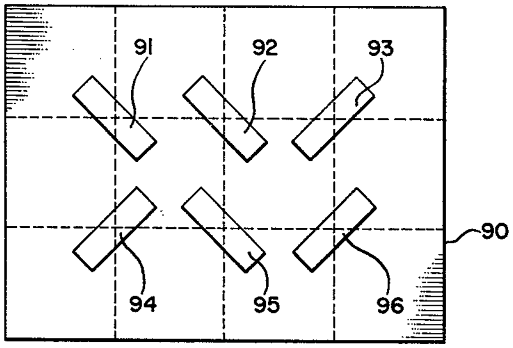
FIGURE 5 illustrates another arrangement for storing data in accordance with this invention.
Figure 6:
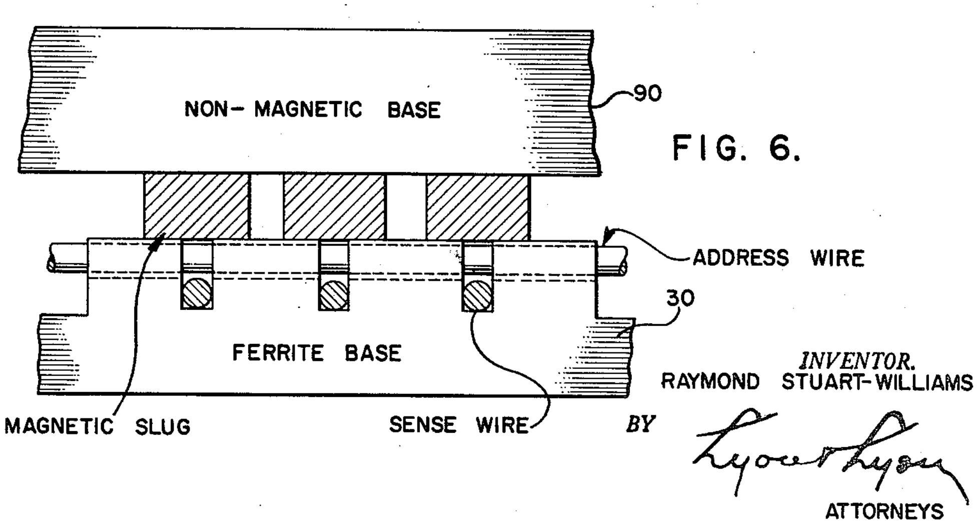
FIGURE 6 is a sectional fragmentary view of an embodiment of this invention.

FIGURE 5 and the fragmentary sectional view in FIGURE 6 represent a rapid arrangement for writing, or rather storing, information in a memory device in accordance with this invention. This would comprise a nonmagnetic base 90, which may be made of card material, for example, on which there may be glued magnetic members 91 through 96 having an orientation determined by the data desired to be stored.

For example, the magnetic members 91, 92, 93 have an orientation representing 110 and the members 94, 95, 96 have an orientation representing 010. These members are applied to the base 90 at locations corresponding to intersections, which are previously ruled on the card and which will correspond with the groove intersections on a base 98 such as is shown in FIGURE 6. Thus, the entire memory may be written into at once, simply and rapidly, by clamping the cards tightly to the base by any suitable means so that the magnetic bridging members properly bridge the groove intersections and orverlie the diagonally positioned lands adjacent these groove intersections. If desired, the lands on the base can be wiped with a magnetic member and the lands. At any time that it is desired to change the information which is stored in a memory of this type, another base with the magnetic material bridging members adhering thereto may be substituted for the one in place. Alternatively, each magnetic member may be attached to a card so that it can be rotated from one to the other diagonal. Thus, each data bit can be entered by rotating the magnetic member to assume the required orientation. Provision can easily be made to change such orientation, either by removing the card first or by rotating the magnetic member while the card is still in place.

A card containing data to be stored may be made up by applying a sufficient amount of magnetic ink to a card through a perforated mask, whereby magnetic bridging members which provide a sufficiently low reluctance are formed. The amount of magnetic material required for bridging the intersections is determined to a great extent by the sensitivity of the sensing circuits and/or the signal-to-noise level present. The lower the magnetic reluctance path which is established by the bridging member, obviously the better the device operates; the higher the signal-to-noise ratio, the less sensitive the sensing circuit required. Thus, these are parameters with which any person skilled in this art is familiar.

Another preferred arrangement for storing information in the magnetic device in accordance with this invention is to have a card which has perforations therein for receiving and holding the magnetic material bridging members. These perforations have the locations corresponding to the intersections on the baseplate of the magnetic storage device. The card is placed over the baseplate, and each of the magnetic material bridging members is either inserted in the holes manually or the arrangement may be mounted on a shaker table and the bridging members may be dumped onto the cards to be shaken into place with excess bridging members removed therefrom. A covering member can then be lowered to force the bridging members in the card openings down onto the baseplate lands.

Figure 7:
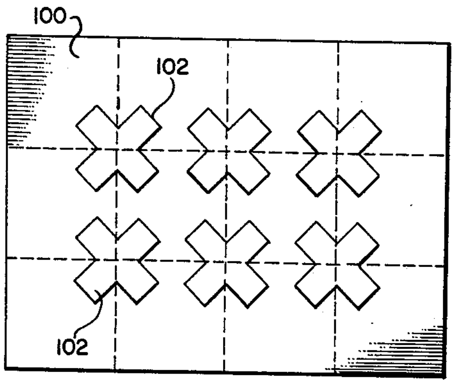
FIGURES 7 and 8 represent alternative arrangements for storing data in accordance with this invention.

A nonmagnetic card 100 may be made up, as shown in FIGURE 7, which has cross-shaped perforations 102 therein which occur at locations corresponding to those of the intersecting grooves of a memory plane. The card is positioned over a memory plane such as the one 30 shown in FIGURE 4. The cross-shaped perforations 102 are then used as guides for positioning magnetic slugs along one or the other of the diagonals at each groove intersection. Another card (not shown) may be placed over the one 100 shown in FIGURE 7 to hold the magnetic slugs in place. If it is desired to alter the data written in the memory, then all or any number of magnetic slugs may be removed by any suitable mechanical means and reinserted in the apertures provided therefor in the card 100.

Figure 8:
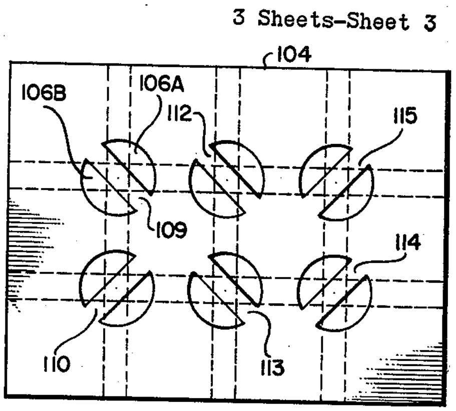

Another arrangement for storing data is shown in FIGURE 8. A card 104 may be entirely made of magnetic material. Holes 106A, 106B are then punched in the card on either side of each intersection of grooves (represented by dotted lines), so that each intersection is bridged by magnetic material 109, 110, 111, 112, 113, 114, along one or the other of the diagonals thereof in accordance with the binary bit desired to be stored. The holes 106A, 106B prevent bridging along both diagonals simultaneously. It will be understood that an equivalent to FIGURE 8 is the use of magnetic plating on a nonmagnetic card, masking said card so that no plating occurs where holes would be otherwise placed. Also, the punching of one hole, either 106A or 106B, can also be used to provide the required bridging and/or flux distortion at an intersection. Such an arrangement, however is not preferred.

It is preferred that the grooves in which the driving wires are placed be made just wide enough to hold the driving wires. If desired, the grooves and driving wires may then be sprayed with insulating material, and the sensing wires can then be laid down. It is preferred that a small air gap exist on each side of the sensing wire. It is preferable that magnetic material is not driven into saturation. The grooves need only be deep enough to contain the driving and sensing wires.

The shape of the bridging magnetic member, although shown as a rectangle in the drawings, need not necessarily be so. It may have any suitable shape, provided that sufficient magnetic material bridges between the diagonally opposite lands to make adequate contact therewith to insure that a sufficiently low magnetic reluctance path for the flux is established, so that there is ample flux distorted and thereby forced to cut through the sensing wire to induce a voltage which exceeds any noise. For this reason, also, it is necessary to insure that the magnetic bridging members or slugs extend between two diagonally opposite lands, and not between all four of the diagonally opposite lands. They should substantially overlie the two diagonally opposite lands for providing the voltage of desired polarity in the sensing wire and, at most, can just touch the corners of the remaining two diagonally opposite lands. To bridge all four of the lands would be to substantially cause the cancellation of any signals induced in the sensing wire, and thus there would be no output.

Figure 9:
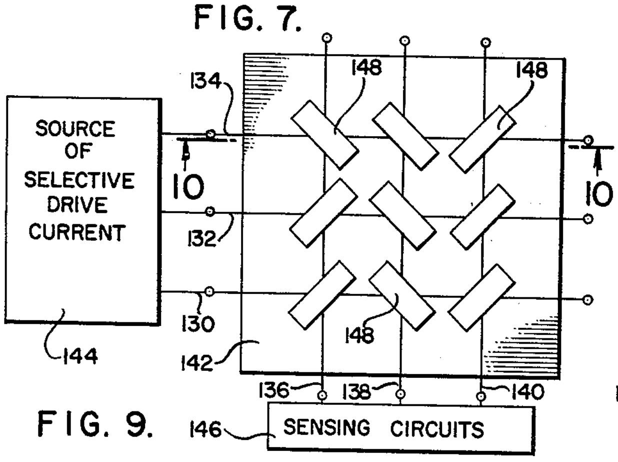
FIGURE 9 illustrates another embodiment of the invention.
Figure 10:
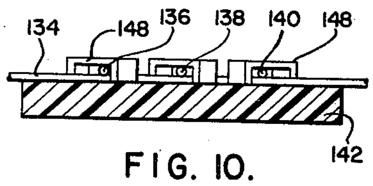
FIGURE 10 is a view in section along the lines 10—10 of FIGURE 9.

FIGURE 9 illustrates another embodiment of the invention. FIGURE 10 is a cross-sectional view along the lines 10—10 in FIGURE 9. In this embodiment of the invention the grooves are omitted. Instead, a grid of wires, consisting of parallel-spaced address or driving wires 130, 132, 134 intersected susbtantially at right angles by parallel-spaced sensing wires 136, 138, 140, are laid down on a plate 142 of magnetic material. The wire grid may be glued to the plate or fastened in any other suitable manner. Preferably, the wire grid may be deposited using printed-circuit techniques with insulation being applied between overlaying wires. The wire grid may also be stretched on a frame, which is then attached to a magnetic material plate 142. The plate 142 may be made of any of the magnetic materials previously mentioned for the grooved ferrite plate. The address wires 130, 132, 134 are driven by a source of selective drive current 144. The signals induced in the sensing wires are detected by sensing circuits 146. The source of selective drive current 144 and the sensing circuits 146 are the same type of circuits as have been described in connection with the preceding embodiments of the invention.

Figure 11:
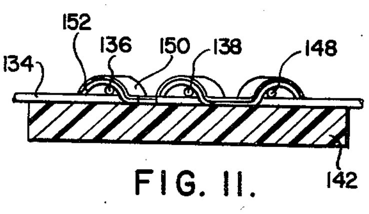
FIGURE 11 illustrates another arrangement for storing data in the embodiment of the invention shown in FIGURE 9.

The means for entering data in the memory are better shown in FIGURE 10 and comprise the U-shaped bridging members 148, made of magnetic material, which bridge each intersection of sensing and driving wires along one diagonal or the other passing through said intersection. As a result, magnetic flux is distorted at the intersection so that it cuts a sensing wire and induces a voltage of one or the other polarity into the sensing wire. As shown in FIGURE 11, a soft card 150 may be used with magnetic ink markings 152 deposited at intersection locations to bridge the intersecting wires along one or the other diagonal passing therethrough in accordance with the information sought to be stored. The soft card bends at each intersection sufficiently to enable the magnetic ink markings 152 to contact the magnetic material plate 142 on both sides of intersecting wires.

Figure 12:
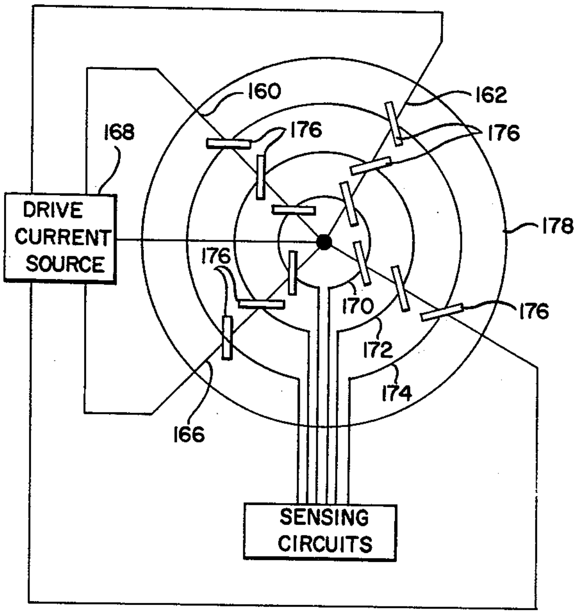
FIGURE 12 is an embodiment of the invention using circular and radially disposed wires.

FIGURE 12 is shown to illustrate the fact that it is not absolutely necessary to have the sensing and drive wires in rectangular grid relationship to obtain a memory operative in accordance with the principles of this invention. Here the drive wires 160, 162, 164, 166 are selectively driven from a drive current source 168, as before. However, these wires are radially disposed relative to sensing wires 170, 172, 174 connected to circuits 175, which sensing wires are circular and concentric relative to one another. The important point is that the circles are made large enough so that in the vicinity of the wire intersections the sensing wires make a very small arc in order that any attributable voltages induced in the sensing wires by an excited drive wire are negligible when compared to the voltages induced because of the presence of a magnetic bridging member 176 present at each wire intersection. As before, the bridging members 176 are made of magnetic material and may be U-shaped, as in FIGURE 9. The principles of operation of this embodiment of the invention are the same as have been explained for the rectangularly disposed sensing and drive wire embodiments.

There has accordingly been described and shown herein a novel and useful arrangement for storing data in a magnetic type of storage wherein data entry into the storage system is simple, random access to such data is provided without destroying it, and extremely simple drive and sensing circuitry can be employed whereby the entire arrangement can be built at a minimum cost.

I claim:

1. A magnetic device comprising a plurality of first wires spaced from one another, means for selectively exciting with current predetermined ones of said plurality of first wires, a plurality of second wires spaced from one another and positioned to intersect said first wires at an angle to prevent a voltage from being induced in a second wire from an excited one of said first wires, said first and second wires being disposed substantially in the same plane, a plate of magnetic material on one side of said first and second wires, a plurality of magnetic members, each of which bridges a different one of the intersections of said first and second wires contacting said plate on opposite sides of said intersection and extending along one or the other of the diagonals extending through an intersection, and means for rotatably supporting said plurality of magnetic members to afford rotation from one to the other of the diagonals extending through an intersection.

2. A magnetic storage device comprising a base of magnetic material, a rectangular grid of grooves on said surface, said grooves separating lands of material, a plurality of sensing wires a different one of which is in and extends along a different one of the grooves in said rectangular grid which are parallel to one another, a plurality of driving wires a different one of which is in and extends along a different one of the groves in said rectangular grid which are at right angles to the grooves wherein said sensing wires are disposed, said sensing and driving wires crossing each other substantially at right angles and being insulated from one another, and a plurality of means of establishing a diagonal magnetic-flux path, each of said means diagonally bridging a different intersection of grooves in said grid of grooves, each said plurality of means for etsablishing a diagonal magnetic flux path comprising magnetic ink which has been deposited on a non-magnetic base, said non-magnetic base being attached to said base of magnetic material to effectuate diagonal bridging of different intersections of grooves by said magnetic ink.

3. A magnetic storage device comprising a base of magnetic material, a rectangular grid of grooves on said surface, said grooves separating lands of material, a plurality of sensing wires a different one of which is in and extends along a different one of the grooves in said rectangular grid which are parallel to one another, a plurality of driving wires, a different one of which is in and extends along a different one of the grooves in said rectangular grid which are at right angles to the grooves wherein said sensing wires are disposed, said sensing and driving wires crossing each other substantially at right angles and being insulated from one another, and means for storing information in said magnetic storage device including a non-magnetic base comprising a card, said card having mounted on one side thereof a plurality of substantially rectangular slugs of magnetic material, one for each intersection of grooves in said magnetic material base, said slugs being disposed over said card with each slug diagonally bridging a different intersection of grooves for establishing a magnetic path thereacross when said card is applied to said magnetic material base whereby information storage occurs in accordance with the ones of the two diagonals intersecting an intersection of grooves which said magnetic material slugs bridge.

References Cited by the Examiner

UNITED STATES PATENTS

| | | | |
|---|---|---|---|
| 2,825,891 | 3/58 | Duinker | 340—174 |
| 2,825,892 | 3/58 | Duinker | 340—174 |
| 3,027,548 | 3/62 | Vaughn | 340—174 |
| 3,060,411 | 10/62 | Smith | 340—174 |
| 3,061,821 | 10/62 | Gribble | 340—174 |
| 3,084,336 | 4/63 | Clemons | 340—174 |

IRVING L. SRAGOW, *Primary Examiner.*

JOHN T. BURNS, *Examiner.*